United States Patent [19]
Richter

[11] Patent Number: 6,043,848
[45] Date of Patent: Mar. 28, 2000

[54] TELEVISION SYSTEM FOR RECOVERING DIGITAL DATA ENCODED IN A TELEVISION SIGNAL

[75] Inventor: Bryan Michael Richter, Fremont, Calif.

[73] Assignee: TeleCruz Technology, Inc., San Jose, Calif.

[21] Appl. No.: 09/158,016

[22] Filed: Sep. 21, 1998

[51] Int. Cl.$^7$ .................................................. H04N 7/08
[52] U.S. Cl. ........................................... 348/465; 348/468
[58] Field of Search ................................. 348/465, 468, 348/476, 461, 572, 466, 478

[56] References Cited

U.S. PATENT DOCUMENTS

| | | | |
|---|---|---|---|
| 5,654,764 | 8/1997 | Suh | 348/468 |
| 5,657,088 | 8/1997 | Hankinson | 348/468 |
| 5,812,207 | 9/1998 | Cahill, III | 348/465 |
| 5,861,925 | 1/1999 | Fujitaka | 348/465 |

*Primary Examiner*—Victor R. Kostak
*Attorney, Agent, or Firm*—Law Firm of Naren Thappeta

[57] ABSTRACT

A television system for recovering the digital data encoded in a television signal at an encoding frequency. The television signal is sampled at a frequency much higher than the encoding frequency, and the resulting sampled data elements are stored in a memory. Sampled data elements corresponding to a clock run-in portion (synchronization signal portion) of the television signal are examined to a samples interval equal to the number of samples per encoding clock periods. Transitions in the values of data elements are determined by examining consecutive sampled data elements. In general, sampled data elements are selected with an interval equal to the determined samples interval as representing the encoded digital data elements. However, the selection sequence is adjusted according to the transitions to ensure that the samples in only the stable portions of the television signal are selected.

18 Claims, 3 Drawing Sheets

TELEVISION SYSTEM FOR RECOVERING DIGITAL DATA ENCODED IN A TELEVISION SIGNAL

RELATED APPLICATIONS

The present invention is related to the following applications, which are incorporated in their entirety herewith:

1. United States patent application entitled, "A Method and Apparatus for Enabling a User to Access Data Network applications from a Television System", Ser. No.: 08/867,203, filed Jun. 2, 1997, now U.S. Pat. No. 5,946,051, (hereafter RELATED APPLICATION 1);
2. United States patent application entitled, "A Method and Apparatus for Reducing Flicker in the Television Display of Network Application Data", Ser. No. 09/001,410, filed Dec. 31, 1997, now U.S. Pat. No. 5,959,680, (hereafter "RELATED APPLICATION 2"); and
3. United States Patent Application entitled, "A Television System Providing for Flexible Display of Images Encoded in a Television Signal Along with Images Representing Network Application Data", Ser. No. 09/157,829, Filed even date herewith (hereafter "RELATED APPLICATION 3").

BACKGROUND OF THE INVENTION

1. Field of the Invention

The present invention relates to television systems, and more specifically to a method and apparatus for recovering the digital data encoded in a television signal.

2. Related Art

Television systems are generally designed to receive and display images encoded in a television signal. Television signals are typically received in a predetermined format such as composite-sync format well known in the arts. A television signal generally includes display data and corresponding synchronization signals. The display data usually represents color intensity for different points and the synchronization signals provide a time reference such that each point is associated with a point of an image. Synchronization signals typically include horizontal synchronization signals separating each line and vertical synchronization signals separating each frame. Each frame usually corresponds to an image and frames are encoded at 60 Hz in conventional television signals according to NTSC format known in the art.

Digital data is encoded in television signals in many instances. For example, digital data is often encoded in the vertical blanking interval (VBI) of a television signal. VBI generally refers to the time duration or signal portion between frames. The VBI duration provides sufficient time for the scan electronics of a (CRT based) television system to move a scan position to point from the bottom end of a display screen to the top. The television signal corresponding to the VBI period typically does not contain any display data (or image data), and thus a television signal portion corresponding to the VBI period has been conveniently used to encode digital data.

Using the ability to encode digital data in a television system, broadcasters (or television signal generators, in general) may send data corresponding to several applications useful for viewers. For example, teletext is often encoded in the VBI to enable the display of closed-captioning on television displays. Some companies broadcast television guide (indicating the program schedule) and some other companies provide stock quotes and news flashes using VBI portion of a television signal. Digital data can be encoded in television signal portions other than VBI also. For example, an entire channel of a television signal can be used to encode teletext data.

Recovery of the digital data encoded in a received television signal typically entails sampling the television signal using a sampling clock having the same frequency ("encoding frequency") as that at which the digital data is encoded. Assuming for illustration that the encoding frequency of digital data representing teletext is 6.4 MHZ, the received television signal also needs to be sampled using a sampling clock having a frequency of 6.4 MHZ.

In addition, the phase of the sampling clock needs to be adjusted such that each sample is taken around the center of the display data portion corresponding to a digital data element. By taking samples at the center of a display data portion, each sample may be taken during a steady-state (stable) period of the display data portion as is well known in the relevant arts. The steady-state of a display data portion accurately represents the digital data encoded in the corresponding display data portion, and the digital data element encoded in the sampled portion can be accurately recovered.

To enable a sampling clock having a matching frequency and desired phase to be generated, reference (synchronization) signals are often included in a television signal. For example, when encoding teletext data, sixteen pulses of the clock signal used for encoding the teletext data are provided in the television signal.

A typical television system recovering digital data includes a phase-locked-loop (PLL) which generates a sampling clock signal synchronized with the reference signals (associated with the digital data) included in a received television signal. As the digital data can be encoded at high frequencies, it is often necessary that the PLL be accurately synchronized with the received reference signals. PLLs operating at high frequencies and with accuracy usually require crystals (or other hardware) operating with a very low jitter. Typically, such crystals or PLLs are expensive, and the high cost may be undesirable at least in some situations.

Therefore, what is needed is a method and apparatus for recovering the digital data encoded in a television signal in a cost-effective manner.

SUMMARY OF THE INVENTION

The present invention is directed to a television system which recovers the digital data encoded in a television signal. The digital data is encoded according to a predetermined format such that the television signal includes a synchronization portion and a data portion. The synchronization signal includes signal level transitions (e.g., from 0 to 1, or 1 to 0) at the encoding frequency. The data portion also encodes the digital data at the encoding frequency. The digital data can be recovered without having to employ expensive components such as accurate phase-lock loop circuits in accordance with the present invention.

A television system in accordance with the present invention may sample a received television signal at a sampling frequency greater (e.g., at least a small multiple times the encoding frequency) than an encoding frequency at which digital data elements are encoded. The resulting sampled data elements are stored in a memory to allow for post-processing.

A processor examines the data elements stored in the memory to recover the encoded data elements. The processor may first determine a samples interval representing an average number of samples taken during an encoding clock period (i.e., inverse of the encoding frequency). That is, the samples interval represents the number of samples (taken at the sampling frequency) taken during one clock period of the encoding clock.

The manner in which samples interval can be determined is described with reference to teletext data format in a television signal. Each horizontal line of a television signal in the teletext data format generally includes a clock run-in signal ("synchronization signal") including 16 bits of alternative ones and zeros (starting with a one or logical high signal). Assuming for illustration that only the clock run-in portion of the television signal is used to determine the samples interval, the total number of samples taken is divided by the number of bits in the clock run-in signal (16) to determine the samples interval. The samples representing the 16 bits can be detected due to the high sampling clock frequency (compared to the encoding frequency) and the transitions present in the clock run-in signal.

Sampled data elements (of the data portion) at the computed interval can be selected to represent the encoded pixel data elements. However, any errors resulting from factors such as mismatch in the sampling frequency and the encoding frequency or the jitter (or other unpredictability) in the sampling clock may accumulate over a period, resulting in incorrect selection. For example, samples may be taken in the unstable portions of the television signal or some of the portions may sampled twice or skipped altogether.

To avoid such accumulation of errors, transition in the values of the encoded pixel data elements can be used to properly align the sampling to the stable portions of a television signal. As an illustration, transitions can be determined by examining successive (consecutive) stored samples. Assuming that stable portions start a short duration (e.g., a sample) after a transition, the next sample after completion of the transition can be selected. Subsequent (or previous) samples can be selected according to the computed interval (or determined encoding frequency). Due to the realignment of the selection using the transitions, accumulation of errors can be avoided, leading to an accurate recovery of the encoded data.

In addition to the realignment in the selection process based on the transitions, longer bit stream can be used in determining the samples interval. For example, many teletext data formats include a framing code (typically 11100100) immediately following the clock run-in signal. All or a portion of the framing code can be used to minimize the error in the computation of the samples interval.

Thus, the present invention enables the recovery of digital data elements encoded in a television signal. This is accomplished by storing the sampled data elements in a memory and examining the stored data to determine the samples representing the encoded digital data elements.

The present invention allows for accurate recovery of the encoded data without having to use accurate phase lock loops. This is achieved by determining the transitions in the successive values of the encoded data, and using the transition to align the selection scheme such that the sampled values correspond to a short duration after the transition where the television signal is likely to be stable and represent the encoded data value.

The present invention is particularly suited for recovering teletext type data as the data is encoded in a format which ensures that a transition of values is present at least once in a small number of bits, and the transition can be used for accurately aligning the selection of the sampled values with the encoding clock phase.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention is directed to a television system which recovers any digital data elements encoded in a television signal. The digital data may correspond to teletext data, WINK applications, television guide data or the like. The television system employs a sampling clock having a frequency much greater than the expected frequency at which the digital data is encoded. In general, the probability of accurate recovery of the encoded data is greater with a higher sampling frequency. Multiple data samples are generated by sampling a received television signal using the sampling clock. As used in the present application, a 'data element' corresponds to a numeric value encoded in a television signal. The data elements together form 'data'.

The sampled data is stored in a memory. As should be readily appreciated, the number of data samples taken within a portion of the television signal encoding digital data is greater than the number of digital data elements encoded in the portion due to the higher frequency used. Therefore, the stored samples are examined to determine which of the sampled elements represent the encoded digital data in accordance with the present invention as described below in further detail with reference to several example embodiments. However, it should be understood that the present invention can be implemented in several other embodiments as will be apparent to one skilled in the relevant arts based on the description herein. Such other embodiments are within the scope and spirit of the present invention.

2. An Embodiment of Television System Implementing the Present Invention

Figure 1:
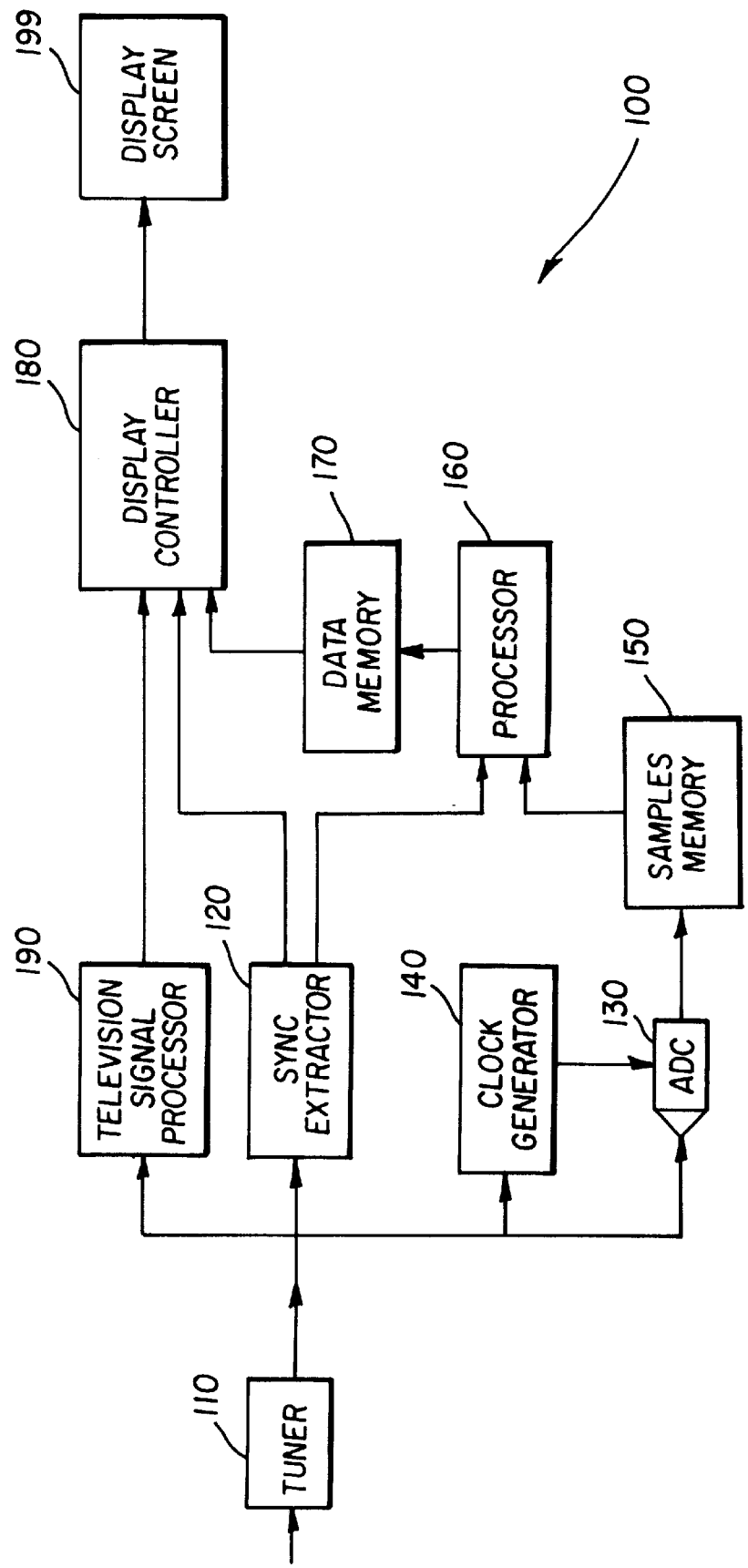
FIG. 1 is a block diagram of a television system for recovering the digital data encoded in a television signal in accordance with the present invention.

In a broad sense, the present invention can be implemented in any television system which displays images encoded in an analog display signal. The television systems include those based on analog (e.g., using CRTs) technology, digital technologies (e.g., HDTV supporting interlaced or non-interlaced format), or the like. FIG. 1 is a block diagram of an embodiment of television system (TV) 100 in which the present invention can be implemented. The operation, structure and use of television system 100 as relevant to the present invention is described here.

Television system 100 includes tuner 110 to extract the television signal corresponding to a channel. In the present application, the television signal corresponding to a channel will be referred to as a television signal also. Digital data encoded in the received television signal can be recovered in accordance with the present invention. Sync extractor 120 extracts the synchronization signals (e.g., HSYNC and VSYNC of a composite video signal) and provides the extracted signals to processor 160 and display controller 180.

Clock generator 140 generates a high frequency clock signal used for sampling a television signal. The frequency generally needs to be high to ensure that sufficient samples are taken from the television signal as will be apparent from the description below. Due to the features provided by the present invention, the sampling clock need not be accurately synchronized with the synchronization signals of the television signals. Accordingly, clock generator 140 may be implemented with low-quality and low-cost crystals, thereby decreasing the overall cost of television system 100.

Analog-to-digital converter (ADC) 130 receives a television signal and samples the received signal according to the clock signal generated by clock generator 140. Due to the high frequency of the clock signals, any portion of the television signal encoding digital data is sampled more number of times than the number of digital data elements sought to be recovered. A sequence of sampled data elements are provided to samples memory 150.

Samples memory 150 stores the sampled data elements. Processor 160 examines the stored data elements in accordance with the present invention to determine which of the sampled data element represent the digital data elements encoded in the sampled television signal. Processor 160 may need to determine a samples interval which represents the number of samples taken in a encoding clock period used for encoding digital data into the received television signal. Assuming for illustration that X samples are taken in each encoding clock period, every $X^{th}$ sample data element can be chosen as representing the encoded data elements.

However, the sampling clock may not generate pulses accurately at uniform intervals, for example due to a low-quality crystal employed in clock generator 140. As the error can be cumulative, inaccurate clock can lead to a television signal portion corresponding to an encoded data element being skipped or being sampled twice. Even with a more accurate clock signal, a television signal portion can be sampled at the unstable portion (that is, away from the middle), leading to an inaccurate recovery of the corresponding encoded digital data element.

Accordingly, it is desirable that intermediate adjustments be made to ensure that the error does not accumulate to an extent that a data element is skipped or sampled twice or sampling occurs in an unstable portion. An intermediate adjustment may be made, for example, by selecting an element other than the $X^{th}$ (with reference to above illustration) sample data element some of the times. The stored data samples may need to be examined to make such intermediate adjustments. An example scheme of examining the data is described below.

Processor 160 may store the selected data elements in data memory 170. The data elements can be used in one of several ways. For example, using the stored data, display controller 180 generates a display of the selected data elements on display screen 199. Display controller 180 may generate a combined display of the data elements and images typically encoded in the display data portion of a television signal. The combined display can be generated in a known way. For example, assuming that the recovered data represents teletext corresponding to closed-caption display, the closed caption display can be overlaid on top of television signal images.

The recovered data elements can also be displayed using the schemes described in RELATED APPLICATION 1, RELATED APPLICATION 2, and RELATED APPLICATION 3, which are incorporated in their entirety herewith into the present application. In schemes described there, the data elements may be treated as network application data, and a bit map is generated to correspond to an image representing the network application data. Each element of the bit map can represent the display on a point of display screen 199. Display controller 180 uses the synchronization signals received from sync extractor 120 to select either the television signal image or network application data image on a point-by-point basis.

Due to such selection, a combined image of television signal images and network application data images can be generated on display screen 199 according to use specification. Television signal processor 190 performs any processing necessary on television signal for such a combining operation. For example, television signal processor 190 can digitize the television signal image to enable a point-by-point selection using digital techniques. On the other hand, if the selection is performed using analog techniques (or analog multiplexer), television signal processor 190 may forward the display data signal to display controller 180 without any precessing. Display controller 180 generates signals compatible with display screen 199 in a known way to display the combined image of the recovered digital data and television signal images.

Therefore, processor 160 recovers the data elements encoded in a received television signal by selecting the appropriate sampled data elements from those stored in sample memory 150. The data elements may be displayed (or used for any other purpose) once properly recovered.

Several schemes can be employed for selecting the correct data samples. A scheme typically depends on the data format used for encoding the digital data. An example recovery scheme is described below with reference to recovering digital data encoded in a VBI portion of a television signal. As the selection scheme depends on the data format, the format of the received is described first. A method of recovery is described then.

3. Format of Digital Data Encoded in VBI Period of a Television Signal

Figure 2:
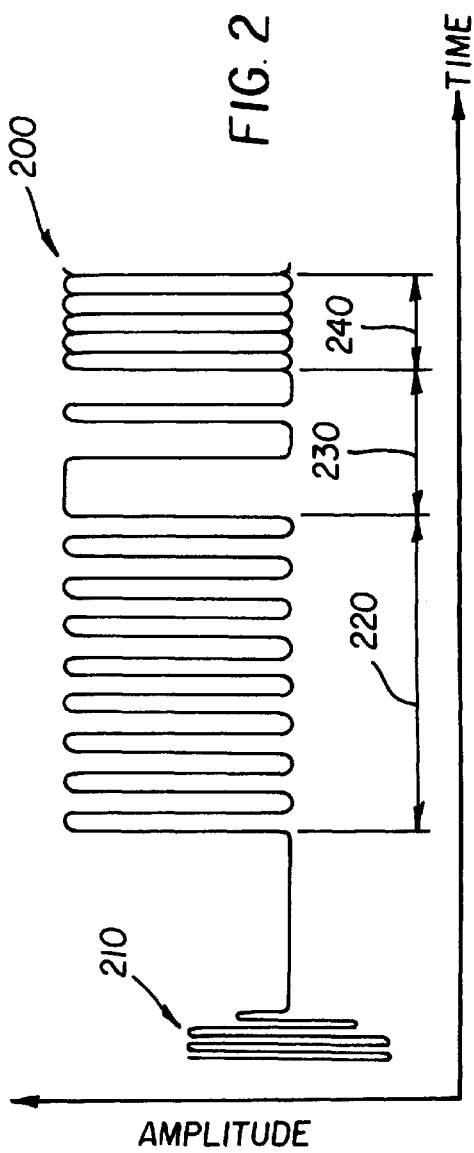
FIG. 2 depicts the amplitude of a television signal as a function of time during a vertical blanking interval illustrating an example format of encoding digital data in the television signal.

FIG. 2 is a diagram of a portion of television signal 200 (with encoded teletext data) with the amplitude shown as a function of time. The diagram illustrates the format of digital data which can be recovered in accordance with the present invention. The digital data may correspond to teletext data, closed-captioning data etc., which are well known in the relevant arts. The description is continued with reference to teletext data format. Only the details of the digital data format as may be applicable to the present invention are described here. For further details, the reader is referred to documents entitled, "EIA-516: Joint EIA/CVCC Recommended Practice for Teletext: North American Basic Teletext Specification (NABTS)", and is incorporated in its entirety herewith into the present application. The documents may be available from Global Engineering Documents, 15 Inverness Way East, Englewood, Colo., 80112, USA, E-Mail: global@ihs.com, Phone Number: 1-800-854-7179, and Fax number: 1-303-397-2740.

A color burst is shown in time duration 210. A clock run-in signal, which represents synchronization signal portion, is shown in time duration 220. Clock run-in signal 220 typically includes 1 and 0 in alternate positions of 16 bits (with a one in the first position), and these bits are encoded using the clock signal as that used to encode digital data elements sought to be recovered. Thus, transitions in clock run-in signals represent the encoding frequency, and are used to synchronize sampling clock signals used for recovering the encoded data. Time duration 230 includes a framing code typically having a bit sequence of 11100100.

Time duration 240 includes digital data bits encoded in television signal 200. This portion may be referred to as data portion. In a case such as here where the digital data is encoded in VBI, the encoding format may be chosen such that there is a transition from one logical values to the other at least once every few bits. For example, an odd parity may be used to ensure that there is at least one transition within a group of bits. In an embodiment described below, an odd parity bit is associated with each eight bits and 264 bits are encoded in the time duration 240. The manner in which the transitions and the clock run-in signals are used to recover the encoded digital data bits is described in further detail below with combined reference to FIGS. 2, 3, and 4.

4. Recovering the Digital Data

Figure 3:
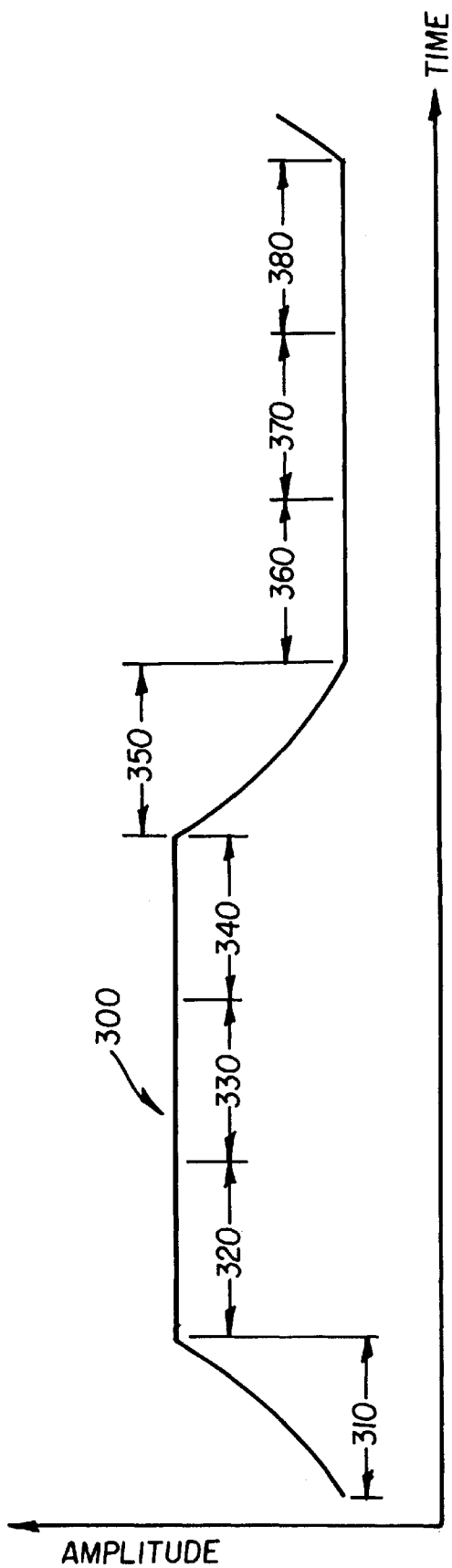
FIG. 3 depicts the amplitude of a television signal as a function of time when two digital data elements are encoded in a television signal.
Figure 4:
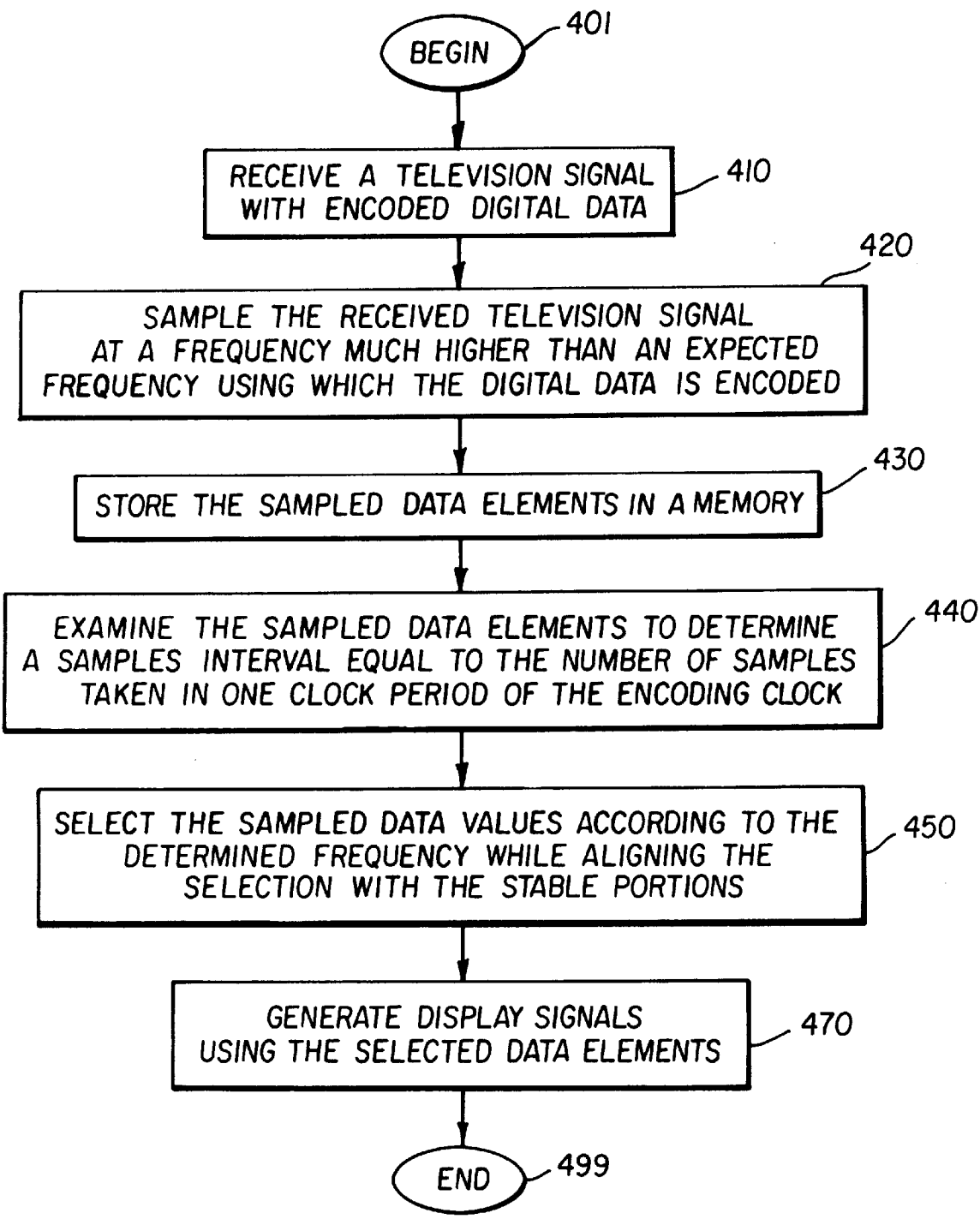
FIG. 4 is a flow-chart illustrating a method according to the present invention.

The manner in which the digital data encoded in a television signal is illustrated with combined reference to FIGS. 2, 3, and 4. FIG. 2 described above illustrates the format of a television signal encoding digital data according to an example scheme. FIG. 3 is diagram of the amplitude of a television signal portion encoding two data elements as a function of time. FIG. 4 is a flow-chart illustrating a method according to the present invention illustrating the manner in which data encoded in the example television signal of FIGS. 2 and 3 can be recovered.

With reference to FIG. 3, a first data element is shown encoded in four equal time durations 310, 320, 330, and 340, and a second data element is shown in four equal time durations 350, 360, 370 and 380. Television signal portions in 310 and 350 are in the unstable areas and any samples in these portions may not accurately represent the digital data element encoded in the portion. Therefore, it is generally desirable that the samples selected as representing the encoded data be taken in the stable portions 320, 330, 340 360, 370 and 380. As described below with reference to FIG. 4, the present invention can be used to ensure that only samples taken in the stable areas are selected as representing the encoded data.

FIG. 4 is a flow-chart illustrating a method in accordance with the present invention. In step 410, a television signal with encoded digital data is received. The digital data is typically encoded with a predetermined format to permit recovery in a television system. The predetermined format may specify an expected frequency and the portion of the television signal (e.g., VBI or entire display data portion) encoding the digital data.

In step 420, at least the portions of the television signal with the encoded digital data and with clock run-in signal are sampled at a frequency much higher than an expected encoding frequency using which the digital data is encoded. In step 430, the sampled data elements are stored in a memory.

Steps 440 and 450 operate to determine which of the stored sampled data elements represent the encoded digital data. In step 440, the sampled data elements are examined to determine a samples interval equal to the number of samples taken in one clock period of the encoding clock. For example, with reference to FIG. 2, the sample data elements taken in the clock run-in portion may be examined to determine the samples interval. As should be clear from the description with reference to FIG. 2 above, the clock run-in portion includes 16 bits and transitions (from zero to one or from one to zero) are guaranteed across successive bits according to a pre-determined convention. In addition, each bit represents a clock period of the encoding clock signal. Thus, assuming X samples are taken during the clock-run-in period, the samples interval may be computed by dividing X with 16.

It may be noted that an error of two (one at the beginning of time duration 220 and the other at the end of time duration 220) samples may be present in the total number of samples taken during the clock run-in portion. The effect of the error can be minimized either by using a faster sampling clock or by using more bits in the computation the samples interval.

In general, using a faster sampling clock increases the overall cost of TV 100. Accordingly, more bits are preferably used in the computation of samples interval. For example, all or a portion of the eight bits in the framing code can be used in the computation. Assuming that all eight bits are used, the number of samples (Y) taken during the 24 encoding clock periods may be determined, and the samples interval can be computed by dividing Y with 24. As 24 is greater that 16, the maximum error in the determination of samples is reduced from 2/16 to 2/24.

In step 450, some of the stored sample data elements are selected as representing the encoded digital data elements. In general, samples at an interval of the computed samples interval represent the encoded data. As an illustration, assuming that samples interval equals 4.2, every fourth successive sample may be selected as representing the encoded digital data element, with the exception that the fifth successive sample is selected as representing the fifth digital data element (to account for 0.2). Groups of five elements can be selected in such a manner.

At least two problems may be encountered with the basic selection scheme of above. First, as noted above at least with reference to FIG. 3, it is desirable that the samples in stable portions be selected. There needs to be a mechanism to ensure that the samples are taken in the stable portions consistently. Second, any error in the computation of the encoding frequency and/or jitter in the sampling clock signal can accumulate over multiple selections, and incorrect data samples may be selected. Accordingly, the selection is adjusted periodically based on an examination of the sampled data elements as described in the below paragraph in accordance with the present invention.

5. Adjustments in Samples Selection

According to an aspect of the present invention, transitions in the values of the encoded values are used to adjust the selection scheme if needed. A transition can be determined, for example, when successive (consecutive) samples have different values. For example, with reference to FIG. 3, assuming a sampling clock having approximately four times the encoding frequency, examination of samples taken during periods 340 and 350 would reveal that there has been a transition in the encoded digital data values.

Once a sample corresponding to a transition is determined, the selection can be adjusted to ensure that samples in the stable portion of the television signal portions are selected as representing the encoded digital data elements. If a sample during time period 360 is used for a determination of a transition, the immediate sample (in time period 370) can be selected as representing the digital data element for portions 360, 370, 380 and 390.

One the time of transition is determined, the selection can be adjusted in the forward and backward directions. That is, with reference to the above illustrations, the previous selected sample may be four samples prior the sample of time period 370 and the next selected sample may be four samples after the sample of time period 370. Such adjustment in forward and backward direction may be possible as the sampled data elements are pre-stored in samples memory 150.

Thus, the transitions can be used to align the selection with the stable portions representing the encoded data elements accurately. For an accurate determination of (the extent of) transition, ADC 130 generating multi-bit samples can be used. The sampled values can then be examined to determine if the sample was taken during the middle of the transition or after transition. Such a determination can be used for further accurately selecting the samples as representing the digitized data values. As described with reference to FIG. 2 above, some encoding formats (such as teletext data format) ensure at least one transition in a predetermined number of bits, and accordingly the selection phase can be adjusted at least once every nine bits for teletext data. Therefore, the forward and backward adjustments can be performed every nine bits for teletext data.

Thus, using the phase adjustment such as the scheme described herein, the digitized data can be accurately recovered even in the presence of an imperfect sampling clock signal or a slightly inaccurate determination of the encoding frequency. It may be further noted that the tolerance to errors is generally more with a sampling clock of higher frequency. In recovering the teletext data, a sampling clock having six times the expected encoding frequency (may be employed for accurate recovery of the encoded data. Once recovered, the digital data can be used in one of several ways. For example, in step 470, the digital data can be displayed on display screen 199 as described above.

Therefore, digital data encoded in a television signal can be recovered accurately in accordance with the present invention without necessarily having to use accurate sampling clocks or synchronization techniques.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of recovering a plurality of digital data elements encoded in a television signal according to a predetermined format, wherein said plurality of digital data elements are encoded in said television signal at an encoding frequency, wherein said television signal includes a synchronization portion having transitions encoded at said encoding frequency, said television signal further including a data portion including said digital data elements encoded at said encoding frequency, said method comprising the steps of:

(a) sampling said television signal at a sampling frequency to generate a sequence of sampled data elements, wherein said sampling frequency is higher than said encoding frequency;

(b) storing said sequence of sampled data elements in a memory;

(c) examining said sequence of sampled data elements to determine a number of samples representing said synchronization portion;

(d) determining a samples interval by dividing said number of samples with a number of transitions in said synchronization portion, wherein said samples interval represents an average number of samples per a clock period corresponding to said encoding frequency;

(e) examining consecutive sampled data elements representing said data portion to determine whether a transition exists in the data values of successive sampled data elements;

(f) forming a plurality of selected data elements by selecting data elements from said sequence of sampled data elements of said data portion generally with an interval equal to said samples interval, but adjusting the selection according to said determination in step (e) to ensure that data elements sampled in stable portions of said television signal are selected, wherein said stable portions are present after the completion of said transitions determined in step (e) and wherein said plurality of selected data elements represent said plurality of digital data elements encoded in said television signal.

2. The method of claim 1, wherein said digital data elements are encoded in said data portion according to a convention which ensures the presence of a transition within a small group of consecutive encoded digital data values such that said adjustment of step (f) can be performed around said small group.

3. The method of claim 2, wherein said digital data elements are encoded in a vertical blanking interval of said television signal.

4. The method of claim 2, wherein said predetermined format comprises teletext data format.

5. The method of claim 1, further comprising the step of generating a display on a display screen based on said selected data elements.

6. The method of claim 1, further comprising the step of generating a sampling clock signal using a low-cost crystal, wherein said adjustment of step (f) enables accurate selection of sampled data elements in spite of any jitter present due to said low-cost crystal.

7. The method of claim 1, wherein said sampling frequency is approximately equal to six times said encoding frequency.

8. A method of recovering a plurality of digital data elements encoded in a television signal according to a predetermined format, wherein said plurality of digital data elements are encoded in said television signal at an encoding frequency and wherein said television signal includes a synchronization portion having transitions encoded at said encoding frequency, said television signal further including a data portion including said digital data elements encoded at said encoding frequency, said method comprising the steps of:

(a) sampling said television signal at a sampling frequency to generate a sequence of sampled data elements, wherein said sampling frequency is higher than said encoding frequency;

(b) storing said sequence of sampled data elements in a memory;

(c) examining said sequence of sampled data elements to determine a number of samples representing said synchronization portion;

(d) determining a samples interval by dividing said number of samples with a number of transitions in said synchronization portion, wherein said samples interval represents an average number of samples per a clock period having said encoding frequency;

(e) forming a plurality of selected data elements by selecting data elements from said sequence of sampled data elements of said data portion with an interval equal to said samples interval, wherein said plurality of selected data elements represent said plurality of digital data elements encoded in said data portion of said television signal.

9. A television system for recovering a plurality of digital data elements encoded in a television signal according to a predetermined format, wherein said plurality of digital data elements are encoded in said television signal at an encoding frequency, wherein said television signal includes a synchronization portion having transitions encoded at said encoding frequency, said television signal further including a data portion including said digital data elements encoded at said encoding frequency, said television system comprising:

sampling means for sampling said television signal at a sampling frequency to generate a sequence of sampled data elements, wherein said sampling frequency is higher than said encoding frequency;

storage means for storing said sequence of sampled data elements in a memory;

examination means for examining said sequence of sampled data elements to determine a number of samples representing said synchronization portion;

determination means for determining a samples interval by dividing said number of samples with a number of transitions in said synchronization portion, wherein said samples interval represents an average number of samples per a clock period having said encoding frequency;

selection means for forming a plurality of selected data elements by selecting data elements from said sequence of sampled data elements of said data portion with an interval equal to said samples interval, wherein said plurality of selected data elements represent said plurality of digital data elements encoded in said data portion of said television signal.

10. The television system of claim 9, further comprising:

examination means for examining consecutive sampled data elements representing said data portion to determine whether a transition exists in the data values of successive sampled data elements;

adjustment means for adjusting the selection according to said determinations of transition by said examination means, wherein said adjustment means control said selection means to ensure that data elements sampled in stable portions of said television signal are selected, wherein said stable portions are present after the completion of said transitions and wherein said plurality of selected data elements represent said plurality of digital data elements encoded in said television signal.

11. A television system for recovering a plurality of digital data elements encoded in a television signal according to a predetermined format, wherein said plurality of digital data elements are encoded in said television signal at an encoding frequency, wherein said television signal includes a synchronization portion having transitions encoded at said encoding frequency, said television signal further including a data portion including said digital data elements encoded at said encoding frequency, said television system comprising:

a clock generator for generating a sampling clock signal having a sampling frequency;

an analog-to-digital converter (ADC) coupled to said clock generator, said ADC sampling said television signal at said sampling frequency to generate a sequence of sampled data elements, wherein said sampling frequency is higher than said encoding frequency;

a memory coupled to said ADC, said memory storing said sequence of sampled data elements;

a processor coupled to said memory, said processor for examining said sequence of sampled data elements to determine a number of samples representing said synchronization portion, said processor determining a samples interval by dividing said number of samples with a number of transitions in said synchronization portion, wherein said samples interval represents an average number of samples per a clock period corresponding to said encoding frequency, said processor forming a plurality of selected data elements by selecting data elements from said sequence of sampled data elements of said data portion generally with an interval equal to said samples interval, wherein said plurality of selected data elements represent said plurality of digital data elements encoded in said television signal.

12. The television system of claim 11, wherein said processor is designed to examine consecutive sampled data elements representing said data portion to determine whether a transition exists in the data values of successive sampled data elements, and to adjust the selection according to said determination to ensure that data elements sampled in stable portions of said television signal are selected, wherein said stable portions are present after the completion of said transitions.

13. The television system of claim 12, wherein said digital data elements are encoded according to a convention which ensures the presence of a transition within a small group of consecutive encoded digital data values, such that said adjustment can be performed for every small group of consecutively encoded digital data elements.

14. The television system of claim 13, wherein said digital element elements are encoded in a vertical blanking interval of said television signal.

15. The television system of claim 13, wherein said digital data represents teletext data encoded.

16. The television system of claim 12, further comprising a display controller generating a display on a display screen based on said selected data elements.

17. The television system of claim 12, further comprising a clock generator generating a sampling clock signal having said sampling frequency, said clock generator having an unstable time base.

18. The television system of claim 12, wherein said sampling frequency is approximately equal to six times said encoding frequency.

* * * * *